March 17, 1970  J. REISACHER  3,500,805
GAS EXCHANGE SYSTEM FOR V-TYPE INTERNAL COMBUSTION ENGINES
Filed Dec. 15, 1967  2 Sheets-Sheet 1

INVENTOR
JOSEF REISACHER

BY *Craig & Antonelli*

ATTORNEYS

United States Patent Office 3,500,805
Patented Mar. 17, 1970

3,500,805
GAS EXCHANGE SYSTEM FOR V-TYPE INTERNAL COMBUSTION ENGINES
Josef Reisacher, Fellbach, Wurttemberg, Germany, assignor to Daimler-Benz Aktiengesellschaft, Stuttgart-Unterturkheim, Germany
Filed Dec. 15, 1967, Ser. No. 690,813
Claims priority, application Germany, Dec. 23, 1966, D 51,858
Int. Cl. F02b 75/18, 75/22, 41/10
U.S. Cl. 123—52                                   42 Claims

ABSTRACT OF THE DISCLOSURE

A gas-exchange system for internal combustion engines, especially for V-type engines having cylinders arranged in the form of a V, in which the inlet and exhaust lines are arranged on opposite sides of the cylinder and in which a swirling motion is imparted to the air or to the mixture within the combustion space by means of the inlet system; the inlet channel arranged in the cylinder head is thereby so arranged at the inlet valve that the swirling motion of the charge medium at the inlet valve is directed essentially toward the side of the inlet line, i.e., inwardly, and at the exhaust valve is directed essentially toward the side of the exhaust line, i.e., outwardly. The inlet channel in the cylinder head leading to the inlet valve is thereby connected with the inlet line by way of a connecting line extending across the cylinder head, either above or through the same.

Background of the invention

The present invention relates to a gas-exchange system for internal combustion engines, especially with cylinders in V-arrangement, including inlet and exhaust lines arranged on opposite sides of the cylinders and provided with a vortexing or rotary movement of the air or of the mixture in the combustion space produced by the inlet line.

It is advantageous for the most part with vehicle engines of V-type to arrange the hot exhaust line on the outside and the inlet line, the injection pump and the like on the inside, i.e., between the cylinders of the V. This arrangement leads to a situation in which the rotating or vortexing movement of the medium produced from the supply of the charge medium (air of mixture) by means of the inlet channel is directed within the combustion space toward the discharge or exhaust direction of the outlet channel. Also the injection nozzle, preferably arranged on the inner side of the engine, is not swept directly by the inflowing cooler air, i.e., is not cooled, which under certain circumstances may lead to difficulties and malfunctionings at the injection nozzle.

Summary of the invention

The present invention aims above all at an improvement of these conditions and essentially consists in such an arrangement of the inlet channel leading to the inlet valve that the vortexing or rotary movement of the air or of the mixture is directed at the inlet valve essentially toward the side of the inlet line and at the exhaust valve essentially toward the side of the exhaust line. In application to V-engines or similar engines with two cylinder rows, this means in particular that with the arrangement of the inlet line essentially on the inside of the cylinder rows and of the exhaust line essentially on the outside of the cylinder rows the rotary movement of the air or of the mixture is directed essentially inwardly at the inlet valve and essentially outwardly at the outlet valve.

In order to obtain such a rotary movement directed toward the side of the inlet line by means of the supply of the inlet channel connected directly upstream of the inlet valve, the inlet lines for purposes of connection to the respective associated and oppositely directed inlet channel, i.e., for the deflection and detour of the charge medium to be supplied to the combustion space, are extended above the cylinder head or through the same.

Above all, the advantage is achieved by the present invention that the vortexing or rotary movement of the air or of the mixture is matched within the combustion space to the supply and exhaust whereby the charge conditions can be improved and the efficiency can be increased correspondingly. Simultaneously therewith, the injection nozzle can be arranged more favorably in relation to the inflowing air so that it is subjected to a stronger cooling action.

These results can be further improved by the fact that in relation to the axial plane of the corresponding cylinder row, the inlet valve is displaced toward the side of the inlet line whereas the exhaust valve is displaced toward the side of the exhaust line. The injection nozzle can be arranged between the two valves and may be accessible from the side of the inlet line, i.e., with V-type engines, from the inside thereof and/or from above.

For purposes of further increasing the charge efficacity in the sense of an after-charge effect, the inlet line can be dimensioned of such length that it acts within an operating rotational speed range of the engine as tuned or resonant suction pipe. This effect can be achieved separately for each individual inlet line or combined with supply lines to several cylinders.

Accordingly, it is an object of the present invention to provide a gas-exchange system for internal combustion engines which avoids by simple means the aforementioned shortcomings encountered heretofore with the prior art constructions.

Another object of the present invention resides in a gas-exchange system for internal combustion engines, especially V-type engines, in which the vortexing or swirling air or mixture movement is directed toward the side of the inlet line at the inlet valve and toward the side of the exhaust line at the exhadst valve.

A further object of the present invention resides in a gas-exchange system for internal combustion engines which improves the charge conditions and efficiency of the engine.

Still another object of the present invention resides in an internal combustion engine of the type described above in which not only the rotating movement of the air or mixture are matched better to the supply and exhaust of the charge medium but additionally the injection nozzle is protected against troubles by an improved cooling effect.

Still a further object of the present invention resides in an engine of the type described above in which an after-charge effect can be readily obtained by utilizing a tuned suction line.

These and further objects, features, and advantages of the present invention will become more obvious from the following description when taken in connection with the accompanying drawing which shows, for purposes of illustration only, two embodiments in accordance with the present invention, and wherein.

Figure 1:
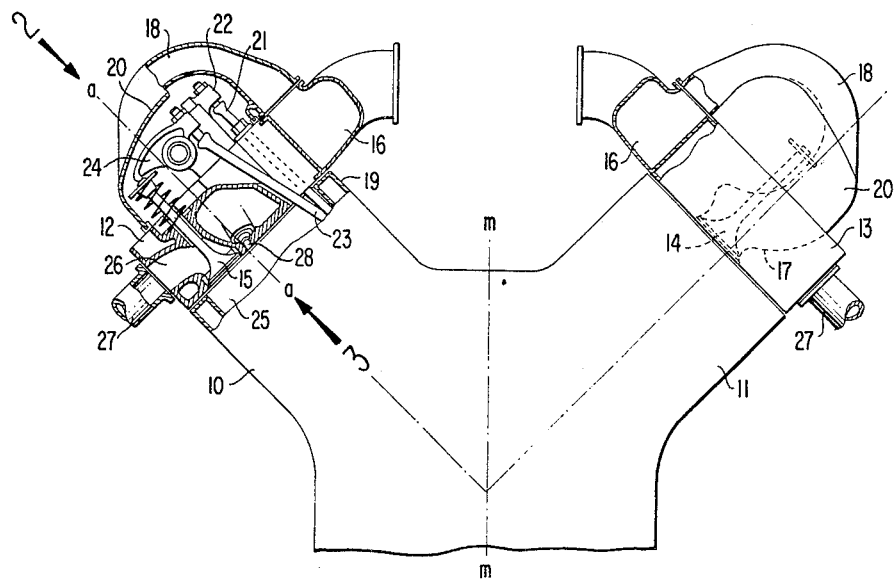
FIGURE 1 is an end elevational view in the longitudinal direction of an internal combustion engine in accordance with the present invention, with parts thereof shown in cross section.

Referring now to the drawing wherein like reference numerals are used throughout the various views to designate like parts, and more particularly to FIGURE 1, the internal combustion engine illustrated therein include two cylinder rows 10 and 11, arranged in the shape of a V, and associated cylinder heads 12 and 13, respectively. The inlet valves 14 and the exhaust valves 15 are arranged in the cylinder heads 12 and 13; the inlet and exhaust valves 14 and 15 are so offset or displaced with respect to the axial plane a—a of a respective cylinder row that the inlet valves are disposed toward the inside, i.e., toward the longitudinal center plane m—m of the V-type engine whereas the exhaust valves 15 are displaced or offset outwardly with respect to the axial plane a—a.

The charging air (or the mixture in case of mixture-compressing engines) is supplied to the inlet valves 14 by way of one respective inlet line 16 each, which may be provided either separately for each cylinder or as common line for all or a group of cylinders of the respective cylinder row. The inlet line 16 is connected with the inlet channel 17 arranged in the cylinder 12 or 13 by way of a connecting line 18 which is extended in an arc above the cylinder head 12 or 13 and terminates from above in the inlet channel 17. The inlet lines 16 can thereby form parts separate from the cylinder head or may be made in one piece with the cylinder head 12 or 13 or may be attached, for example, laterally at the cylinder head or together with the cylinder head may be inserted between the cylinder block 19 of the cylinder rows 10 or 11 and the associated cylinder head hood 20. The connecting line 18 may be appropriately made thereby in one piece with the cylinder head hood 20.

The inlet valves 14 are actuated by push rods 21 and rocker arms 22 while the exhaust valves 15 are actuated by push rods 23 and rocker arms 24 whereby the push rods 21 and 23 are arranged on the inner side of the cylinders, i.e., on the side of the cylinders adjacent the center plane m—m of the V engine. The exhaust gases are conducted out of the combustion space 25 of the engine between piston and cylinder past the exhaust valve 15 and by way of the exhaust channel 26 in the cylinder head into the exhaust lines 27.

Figure 2:
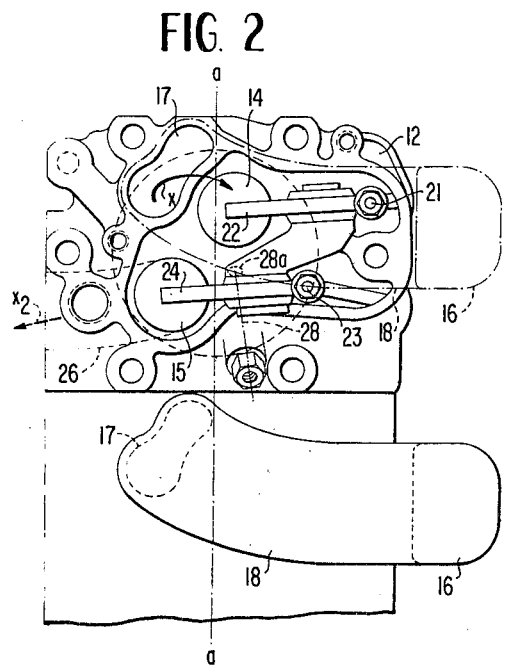
FIGURE 2 is a top plan view on the cylinder head taken in the direction of arrow 2 of FIGURE 1 with the cylinder head hood removed.
Figure 3:
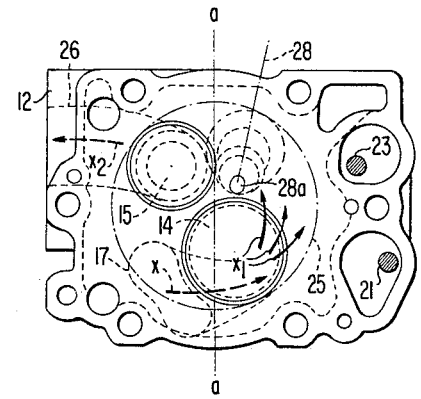
FIGURE 3 is a bottom plan view on the cylinder head in the direction of arrow 3 of FIGURE 1.

As can be seen in particular from FIGURES 2 and 3, the inlet channel 17 terminates at the inlet valve 14 approximately tangentially in the cylinder space or in the combustion space 25 forming a part thereof so that the charge medium supplied from the inlet line 16 by way of the connecting line 18 enters the combustion space approximately tangentially in the direction of arrow $x$, and more particularly inwardly, so that within the cylinder or combustion space 25, a swirling or rotating movement of the air takes place in the direction of arrow $x_1$ (FIG. 3) about the combustion space or cylinder axis. The exhaust channel 26 also branches off in the same direction of rotation, however, directed toward the outside (as viewed in plan view on the engine) out of the combustion space or cylinder space as indicated by the direction of arrow $x_2$.

An injection nozzle 28 is inserted into the cylinder head preferably obliquely from above and from the inner side, and more particularly in such a manner that its discharge 28a is disposed in the combustion space between the inlet valve 14 and the exhaust valve 15 in closest possible proximity to the cylinder axis in such a manner that the fresh air flowing out of the inlet channel 17 in the direction of arrow $x$ flows about the nozzle orifice 28a.

In the embodiment according to FIGURE 1, each cylinder row 10 and 11 is provided with a separate inlet line 16. However, a common inlet line may also be co-ordinated to both cylinder rows. Also, several cylinders of one or both cylinder rows may be supplied in groups from a common inlet line as, in principle, the present invention is not limited to any particular combination of inlet lines. Similarly, the exhaust lines for each cylinder row may discharge into the atmosphere, for example, by interposition of a silencer or a muffler, or the exhaust lines of both cylinder rows may be combined prior to discharge into the atmosphere and may lead, for example, to a common silencer or muffler.

Figure 4:
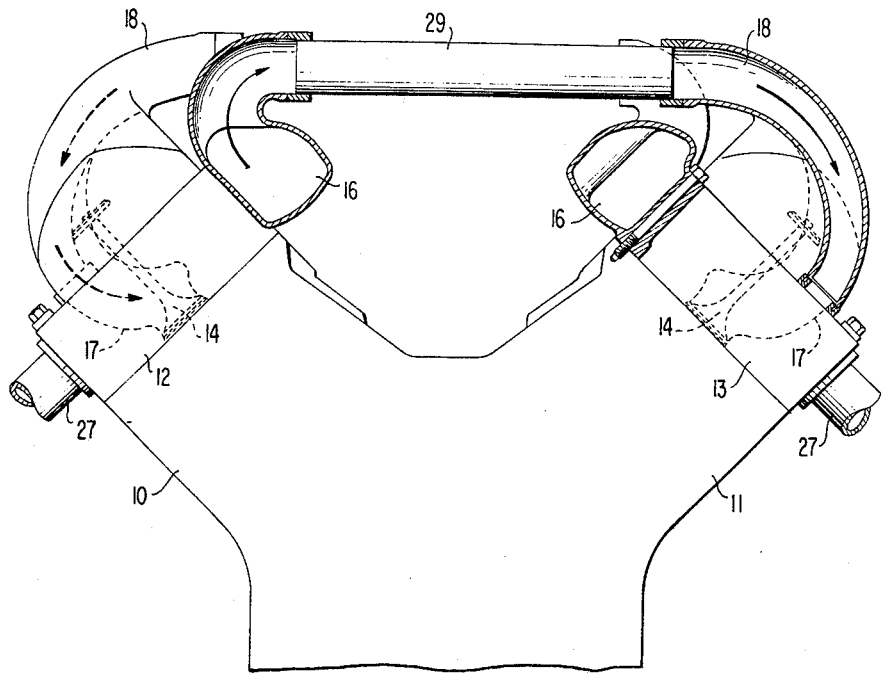
FIGURE 4 is an end elevational view in the longitudinal direction, similar to FIGURE 1, of a modified embodiment of an internal combustion engine in accordance with the present invention.
Figure 5:
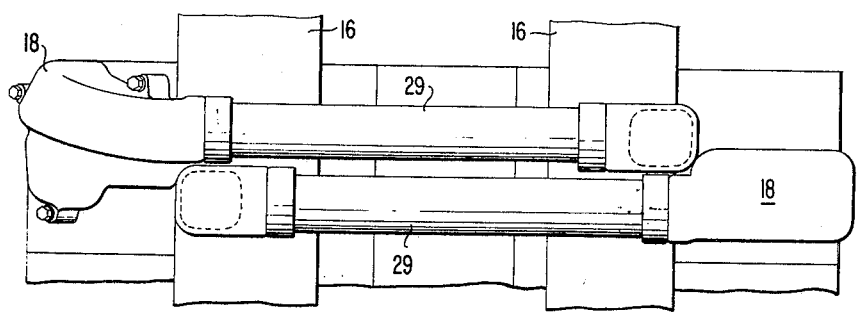
FIGURE 5 is a partial plan view on the engine of FIGURE 4.

The embodiment according to FIGURES 4 and 5 differs from the preceding embodiment essentially in that the inlet channels 17 for the inlet valves 14 are not connected by way of the connecting lines 18 with the inlet line arranged at the corresponding cylinder row but with the inlet line 16 of the respective opposite cylinder row by the interposition of an additional connecting line 29 each. The entire inlet line inclusive connecting lines and inlet channel 17 up to the inlet valve 14 thereby receives a relatively great length which can be exploited for the purpose that it acts within an operating rotational speed range of the engine as tuned suction pipe.

It is thereby possible essentially without increasing the engine dimensions to achieve an after-charge effect at the end of the suction stroke by the gas oscillations in the relatively long tuned suction pipes and therewith a higher engine output.

A corresponding arrangement can also be provided in combination with an exhaust gas turbo-charge system. The further advantage is achieved thereby that the torque is increased above all in the lower rotational speed range by the relatively long tuned suction pipes whereas the torque of the engine is raised in the upper rotational speed range by means of the turbo charger.

I claim:

1. In an internal combustion engine with at least two cylinders in V-like arrangement, forming a longitudinal plane of symmetry, cylinder head means for the cylinders, an inlet valve and an exhaust valve for each sylinder in the respective cylinder head means and inlet line means and exhaust line means for a respective cylinder space, characterized in that each inlet line means is arranged on the inside of the cylinder head means in the V-angle space between the cylinders, connecting line means operatively connecting the inlet line means with a respective inlet valve, said connecting line means extending to and terminating at the side of the inlet valve opposite the plane of symmetry in relation to a plane parallel to said plane of symmetry and passing through the center of the inlet valve so that a rotating flow is produced in the cylinder space which is directed from the inlet valve with a component toward said plane of symmetry and thereafter toward the exhaust valve with a component away from said plane of symmetry.

2. The combination according to claim 1, characterized in that the connecting line means arcuately extends over the cylinder head means.

3. The combination according to claim 1, characterized in that the exhaust line means extends out of the cylinder at the exhaust valve in the direction of the rotating flow as viewed in the axial direction of the exhaust valve.

4. The combination according to claim 1, characterized in that two inlet line means are provided in said V-angle space which extend approximately parallelly to said plane of symmetry, and in that the connecting line means connects an inlet valve in one cylinder head means with the inlet line means disposed closer to the cylinder head means.

5. The combination according to claim 1, characterized in that the cylinders of V-like arrangement form several rows each containing a plurality of cylinders, one inlet line means each for a respective cylinder row and common to the cylinders thereof, and in that the cylinders of a given row are connected with the corresponding inlet line means by way of the connecting line means extending over the associated cylinder head means.

6. The combination according to claim 5, characterized in that two inlet line means are provided in said V-angle space which extend approximately parallelly to said plane of symmetry, and in that the connecting line means connects an inlet valve in one cylinder head means with the inlet line means disposed closer to the other cylinder head means.

7. The combination according to claim 6, characterized in that the exhaust line means extends out of the cylinder at the exhaust valve in the direction of the rotaing flow as viewed in the axial direction of the exhaust valve.

8. The combintion according to claim 7, characterized in that the connecting line means arcutely extends over the cylinder head means.

9. In an internal combustion engine with at least two cylinders in V-line arrangement forming a lognitudinal plane of symmetry, cylinder head means for the cylinders, an inlet valve and an exhaust valve for each cylinder arranged in the respective cylinder head means, inlet channel means for each cylinder in the respective cylinder head means which is controlled by the respective inlet valve, characterized in that a respective inlet channel means is operatively connected with an inlet line means located on the opposite side of the plane of symmetry by way of a connecting line means to a resonant suction pipe system, and in that the inlet channel means as viewed in the axial direction of the cylinder, terminates approximately tangentially, on the side of the respective cylinder opposite said plane of symmetry, in the cylinder in the direction toward the plane of summetry in such a manner that the air flowing-in at the inlet valve produces a rotary flow in the cylinder about the cylinder axis, exhaust channel means being controlled by the respective exhaust valve and leading from the respective exhaust valve toward the side of the cylinder opposite said plane of symmetry.

10. The combination according to claim 9, characterized in that an ignition means and an injection means are located in the space between inlet valve and outlet valve, as viewed in the direction of rotation of the flow.

11. The combination according to claim 10, characterized in that exhaust-gas trubo-charger means are operatively connected in the inlet line means.

12. The combination according to claim 9, characterized in that the connecting line means leading to the inlet channel means of a respective cylinder is extended above the corresponding cylinder head means to the side of the cylinder opposite said plane of symmetry and is connected with the inlet channel means.

13. The combination according to claim 12, characterized in that an ignition means and an injection means are located in the space between inlet valve and outlet valve, as viewed in the direction of rotation of the flow.

14. The combination according to claim 13, characterized in that exhaust-gas turbo-charge means are operatively connected in the inlet line means.

15. The combination according to claim 1, characterized in that each connecting line means is formed in part by an inlet channel means provided in the respective cylinder head means.

16. The combination according to claim 1, characterized in that only one inlet valve and one exhaust valve is provided for each cylinder.

17. The combination according to claim 9, characterized in that only one inlet valve and one exhaust valve is provided for each cylinder.

18. A gas-exchange system according to claim 1, wherein the connecting line means are extended through the cylinder head.

19. A gas-exchange system according to claim 12, wherein the connecting line means terminate in the essentially rearwardly directed inlet channel means essentially from above.

20. A gas-exchange system according to claim 19, wherein the inlet valve is displaced in relation to the axial plane of the respective cylinder row toward the side of the inlet line means and the exhaust valve toward the side of the respective exhaust line means.

21. A gas-exchange system according to claim 20, further comprising injection nozzle means arranged between the corresponding inlet and exhaust valves, said injection nozzle means being accessible from the side of the inlet line means.

22. A gas-exchange system according to claim 21, wherein said injection nozzle means is accessible from above.

23. A gas-exchange system according to claim 21, wherein the inlet line means is made in one piece with the cylinder head.

24. A gas-exchange system according to claim 21, wherein a section of the connecting line means connected upstream of the inlet channel means is formed in one piece with the cylinder head.

25. A gas-exchange system according to claim 21, wherein the connecting line means are formed in one piece with the cylinder head hood.

26. A gas-exchange system according to claim 21, wherein a section of the connecting line means connected directly upstream of the inlet channel means is formed in one piece with the cylinder head hood.

27. A gas-exchange system according to claim 21, wherein the inlet line means inclusive connecting line means and inlet channel means are of such length that they act in a given operating rotational speed range of the engine as tuned suction pipe means.

28. A gas-exchange system according to claim 27, for V-engines or similar engines, wherein the inlet channel means of a respective cylinder row are supplied from an inlet line means arranged at the other cylinder row.

29. A gas-exchange system according to claim 21, wherein each individual connecting line means, inclusive inlet channel means, which connects the inlet channel means of a cylinder with an inlet line means of the other cylinder row is contructed as tuned suction pipe means.

30. A gas-exchange system according to claim 29, wherein a common inlet line means is provided for a number of cylinders.

31. A gas-exchange system according to claim 30, further comprising exhaust turbo-charger means in the common inlet line means.

32. A gas-exchange system according to claim 9, wherein the inlet valve is displaced in relation to the axial plane of the respective cylinder row toward the side of the inlet line means and the exhaust valve toward the side of the respective exhaust line means.

33. A gas-exchange system according to claim 32, further comprising injection nozzle means arranged between the corresponding inlet and exhaust valves, said injection nozzle means being accessible from the side of the inlet line means.

34. A gas-exchange system according to claim 1, wherein the inlet line means is made in one piece with the cylinder head means.

35. A gas-exchange system according to claim 12, wherein a section of the connecting line means connected upstream of the inlet channel means is formed in one piece with the cylinder head.

36. A gas-exchange system according to claim 1, wherein the connecting line means are formed in one piece with the cylinder head hood.

37. A gas-exchange system according to claim 12, wherein a section of the connecting line means connected directly upstream of the inlet channel means is formed in one piece with the cylinder head hood.

38. A gas-exchange system according to claim 12, wherein the inlet line means inclusive connecting line means and inlet channel means are of such length that they act in a given operating rotational speed range of the engine as tuned suction pipe means.

39. A gas-exchange system according to claim 12, wherein each individual connecting line means, inclusive inlet channel means, which connects the inlet channel means of a cylinder with an inlet line means of the other cylinder row is constructed as tuned suction pipe means.

40. A gas-exchange system according to claim 1, wherein a common inlet line means is provided for a number of cylinders.

41. A gas-exchange system according to claim 40, further comprising exhaust gas turbo-charger means in the common inlet line means.

42. A gas-exchange system according to claim 41, wherein the connecting line means connected with the inlet channel means are constructed as relatively long resonant suction pipe means.

References Cited
UNITED STATES PATENTS

| | | |
|---|---|---|
| 1,513,433 | 10/1924 | Sherbondy. |
| 1,960,362 | 5/1934 | Woolson _____ 123—30.2 |
| 2,916,027 | 12/1959 | Chayne et al. |
| 2,927,564 | 3/1960 | Turlay et al. |
| 2,974,654 | 3/1961 | Bouvy et al. |
| 3,054,390 | 9/1962 | Meurer et al. _____ 123—30.2 |
| 3,094,974 | 6/1963 | Barber _____ 123—30.2 |
| 3,159,148 | 12/1964 | Nallinger et al. __ 123—30.2 XR |

FOREIGN PATENTS

| | | |
|---|---|---|
| 394,647 | 9/1931 | Great Britain. |
| 410,047 | 5/1934 | Great Britain. |
| 615,324 | 1/1949 | Great Britain. |
| 1,192,664 | 4/1959 | France. |
| 591,045 | 4/1959 | Italy. |

WENDELL E. BURNS, Primary Examiner

U.S. Cl. X.R.

60—13; 123—30, 55, 188, 193